United States Patent [19]

Watson

[11] Patent Number: 4,457,902

[45] Date of Patent: Jul. 3, 1984

[54] HIGH EFFICIENCY HYDROCARBON REDUCTION OF SILICA

[76] Inventor: Keith R. Watson, P.O. Box 1537, Sante Fe, Calif. 92067

[21] Appl. No.: 342,725

[22] Filed: Jan. 25, 1982

Related U.S. Application Data

[63] Continuation of Ser. No. 200,529, Oct. 24, 1980, abandoned.

[51] Int. Cl.$^3$ ............................................. C01B 33/02
[52] U.S. Cl. ..................................... 423/350; 423/349
[58] Field of Search ....................... 423/348, 349, 350; 422/202, 204

[56] References Cited

U.S. PATENT DOCUMENTS

| 1,002,988 | 9/1911 | Helfenstein | 75/10 R |
|---|---|---|---|
| 1,473,784 | 11/1923 | Dow | 75/10 R |
| 4,102,764 | 7/1978 | Harvey et al. | 204/164 |
| 4,172,883 | 10/1979 | Ingle et al. | 423/348 |

FOREIGN PATENT DOCUMENTS

904239  8/1962  United Kingdom ................ 423/350

OTHER PUBLICATIONS

*Encyclopedia of Chemical Reactions*, ed. by C. A. Jacobson, Reinhold Publishing Co., New York, 1949.
*Chemical Process Industries*, 3rd Ed., by R. Norris Shreve, McGraw-Hill, New York, 1973, p. 259.
Perry et al., *Chemical Engineer's Handbook*, 5th Ed., McGraw-Hill, 1973, Chap. 9, p. 25.

*Primary Examiner*—John Doll
*Assistant Examiner*—Steven Capella
*Attorney, Agent, or Firm*—William W. Haefliger

[57] ABSTRACT

A process to reduce $SiO_2$ to produce Si, includes the steps:
(a) reacting $SiO_2$ with a saturated hydrocarbon at elevated temperature in a retort, to produce molten Si, and gases including SiO, CO, $H_2$ and $H_2O$,
(b) removing such gases from the retort and separating SiO in a first stream and CO, $H_2O$ and $H_2$ in a second stream,
(c) combusting the second stream to produce heat, and
(d) utilizing such heat to aid the reaction in the retort.

17 Claims, 1 Drawing Figure

HIGH EFFICIENCY HYDROCARBON REDUCTION OF SILICA

This is continuation of application Ser. No. 200,529, filed Oct. 24, 1980 now abandoned.

BACKGROUND OF THE INVENTION

This invention relates generally to production of pure silicon from silica, and more particularly concerns a retort process wherein silica is reacted with a hydrocarbon to produce high grade molten silicon which is then further purified.

There is a continuing and increasing need for supplies of silicon of high purity, as for example is usable to produce high quality semiconductors. Known prior process are excessively and undesirably expensive and complex, typically consuming excessive amounts of energy. Accordingly, a need exists for an energy conserving process to produce highly purified silicon, with minimum complexity.

SUMMARY OF THE INVENTION

It is a major object of the invention to provide a process and apparatus to meet the above need. Basically, the process of the invention employs a retort in which $SiO_2$ is reduced, and comprises the following steps:

(a) reacting $SiO_2$ with a saturated hydrocarbon at elevated temperature in said retort, to produce molten Si, and gases including SiO, CO, $H_2$ and $H_2O$, (b) removing said gases from the retort and separating SiO in a first stream and CO, $H_2O$ and $H_2$ in a second stream, (c) combusting said second stream to produce heat, and (d) utilizing said heat to aid the reaction in the retort.

The reaction of $SiO_2$ with the hydrocarbon is in accordance with the following equation:

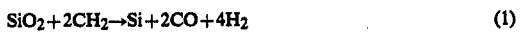

$$SiO_2 + 2CH_2 \rightarrow Si + 2CO + 4H_2 \quad (1)$$

Some water is also typically produced. Free energy $\Delta G$ equal to approximately $-30$ kilo calories per mole at 2,000° K. indicates an excellent reaction. Also, the use of a saturated hydrocarbon assures high purity of the silicon product. This process is to be distinguished from the following less advantageous reaction:

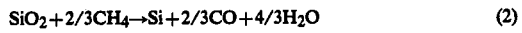

$$SiO_2 + 2/3 CH_4 \rightarrow Si + 2/3 CO + 4/3 H_2O \quad (2)$$

In the latter, free energy $\Delta G = +10$ kilo calories per mole, at 2300° K., which is much less satisfactory.

As will appear, the second stream combustion is typically carried out in a combustion zone or furnace adjacent the retort; the removed SiO may be returned to the interior of the retort for further reduction, and in particular it may be condensed to liquid state for such return; the condensing of the SiO may be effected in a heat exchanger wherein an $O_2$ or air feed stream (to the combustion zone) is pre-heated; and the hot combustion products from the combustion zone may be used to further preheat the $O_2$ or air feed, as well as the combustible gas and also the feed stock hydrocarbon (as for example $CH_4$).

It is a further object of the invention to provide for further purification of the produced molten Si as in a chamber wherein $SiF_4$ is bubbled or blown into the molten silicon to produce fluoride combined impurities (such as Al $F_3$ and $BF_3$) removed from that chamber. Those compounds may be subsequently reacted with hot $SiO_2$ to produce $SiF_4$ which is returned to the $SiF_4$ feed to the bubble chamber. That feed may also be pre-heated by the hot combustion products, as will be seen. $SiO_2$ is supplied as needed. Accordingly, a very efficient heat utilization process is provided, and from which very high purity Si is derived, and particularly with respect to boron, aluminum, iron and phosphorous impurities.

These and other objects and advantages of the invention, as well as the details of an illustrative embodiment, will be more fully understood from the following description and drawings, in which:

DRAWING DESCRIPTION

FIG. 1 is a process flow diagram.

DETAILED DESCRIPTION

Figure 1:
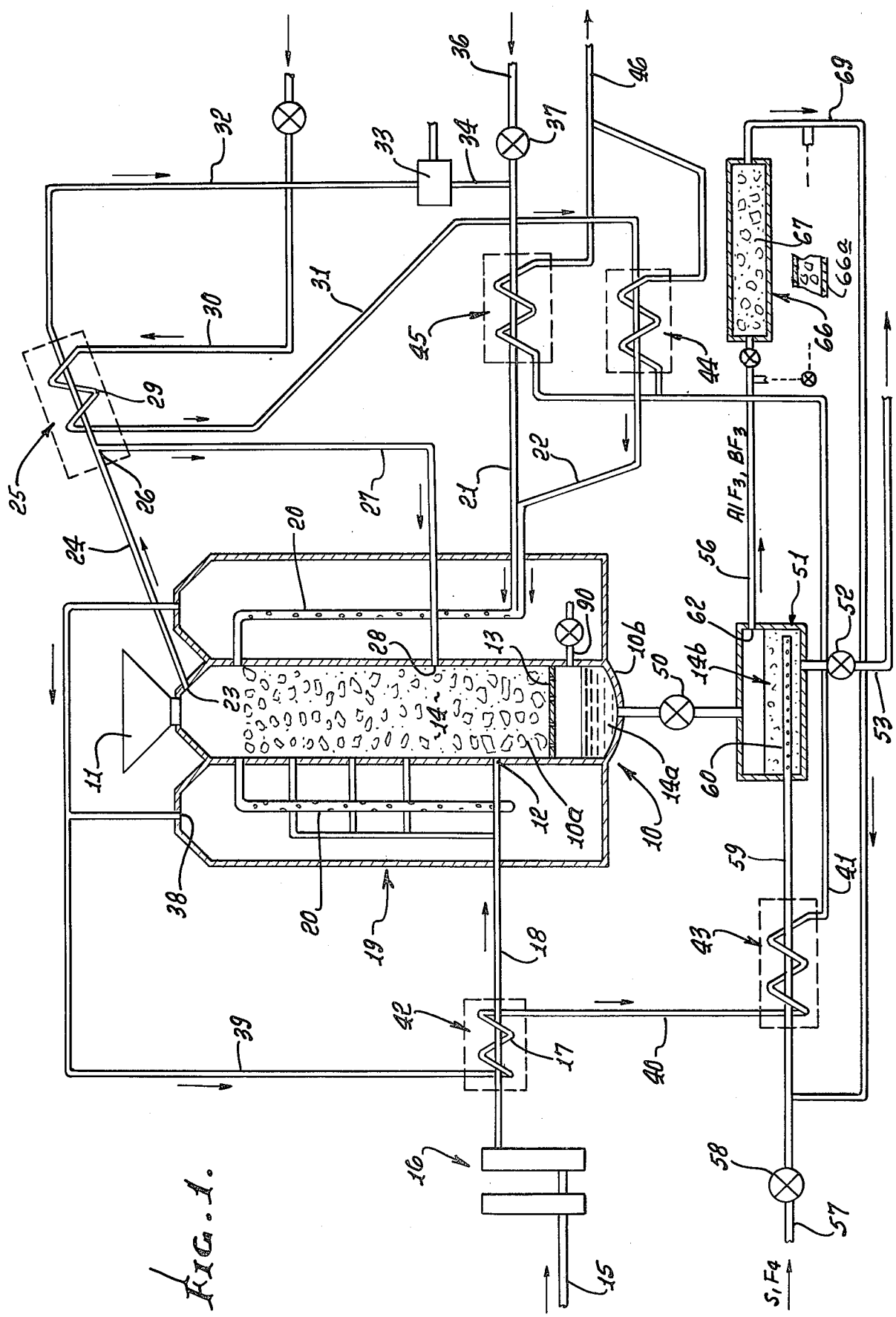

Referring to the drawing, a retort is shown at 10, and to which silica is supplied, as via a hopper 11 at the upper end of the vertically elongated retort. Hydrocarbon gas, as for example methane is supplied to the lower interior 10a of the retort, via inlet 12. Silica 14 is packed into the retort from lower interior 10a upwardly as shown. A suitable perforated support 13 carries the solid state silica, and molten silicon product drains into a pool 14a in the lowermost portion 10b of the retort below support 13. The feed stock methane is supplied via duct 15, wet scrubbers 16, heat exchanger duct 17 wherein the methane is pre-heated, and duct 18. The temperature at 17 and 18 is slightly less than carbonization temperature. Slag is removed at 90.

Surrounding the retort 10 is a furnace chamber 19 within which gas burners 20 extend, as shown. The burners receive combustible gas via duct 21 and oxygen (as for example in air) via duct 22, and flames in the furnace produce temperatures in the retort sufficient to reduce the silica in the presence of methane (or other hydrocarbon gas). Thus, the liquid product Si is produced together with gases which include CO, SiO, $H_2$ and $H_2O$, typically at temperatures between 1,500° C. and 2,000° C.

The gases are removed from the retort as via discharge outlet 23. They first pass via duct 24 to a condenser 25 in which gaseous SiO is condensed to liquid SiO at less than 1,880° C. and greater than 1702° C. The removed SiO drains in a first stream via outlet 26 from duct 24, and is typically returned via duct 27 to the retort, as via side inlet 28. The condenser 25 may incorporate a coil 29 to which cool air is supplied via duct 30, to preheat that air for supply via duct 31 to duct 22 referred to above.

The remaining gases, CO, $H_2$ and $H_2O$ flow in a second stream from condenser 25 and via duct 32 to a zone 33 wherein $H_2O$ is removed (as by a suitable getter). From zone 33, the $H_2O$ and CO are returned to the burners via ducts 34 and 21. Supply hydrocarbon fluid, as for example natural gas ($CH_4$) may be added as via duct 36 and control valve 37, to provide sufficient heat to sustain the required temperature for the reduction reaction.

The hot combustion products exit the furnace chamber via outlets 38 and flow via ducts 39–41 to heat exchangers 42–45, and finally to a flue, as via duct 46. Exchanger 42 serves to preheat the feedstock $CH_4$;

exchanger 44 serves to preheat the air or $O_2$ intake; the exchanger 45 preheats the combustible furnace gases in duct 21.

The invention also provides for removal of impurities from the molten product Si at 14a. For that purpose, the molten Si is controllably drained, via valve 50, into a purification chamber 51, the silicon indicated therein at 14b. Highly purified Si is removed i.e. drained from chamber 51 as via valve 52 and duct 53. Silicon tetrafluoride ($SiF_4$) is reacted with the molten Si in chamber 51 to remove the impurities in fluoride combined form. See for example the removal duct 56 with indicated outflow of $AlF_3$ and $BF_3$, the Al and B being typical impurities in the molten silica. For this purpose, $SiF_4$ is supplied via duct 57, valve 58, heat exchanger 43 (in which the $SiF_4$ feed is heated) and duct 59 to a perforated tube 60 in the silica pool or bath 14b. The hot $SiF_4$ is bubbled or blown through the molten silica to react therewith and produce the fluoride combined impurities removed in a flow stream via outlet 62 and duct 56. That stream is subsequently reacted with hot $SiO_2$ (say in a hot quartz tube 66 containing hot quartz chips 67 to produce $SiF_4$) which is recycled at 69 to the supply $SiF_4$ stream, flowing to the chamber 51.

The product Si flowing in duct 53 is solar pure, and may be used or supplied to a unidirectional semicrystalline carbon crucible solidification process or other standard Czochralski process utilized in producing a conventional semiconductor quality silicon.

A second tube 66a, like tube 66, may be connected in parallel with tube 66, with appropriate valves, to enable continuous operation.

I claim:

1. In the process of reducing $SiO_2$ in a retort to produce Si, the steps that include
   (a) reacting $SiO_2$ with a saturated hydrocarbon at elevated temperature between 1,500° C. and 2,000° C. in said retort, to produce molten Si, and gases including SiO, CO, $H_2$ and $H_2O$,
   (b) removing said gases from the retort and separating SiO in a first stream and CO and $H_2$ in a second stream,
   (c) combusting said second stream with a third stream of air or $O_2$ in a combustion zone adjacent the retort to produce heat, and
   (d) utilizing said heat to aid the reaction in the retort.

2. The process of claim 1 wherein hot combustion products are produced by said combustion, and including the step of flowing said hot combustion products in pre-heating relation with said hydrocarbon being supplied to the retort.

3. The process of claim 1 including the step of returning said first stream SiO to the retort.

4. The process of claim 3 including condensing said gaseous SiO to produce liquid SiO for return to the retort.

5. The process of claim 1 including the step of flowing at least one of said first and second streams in preheating relation with said third stream $O_2$.

6. The process of claim 1 including the step of flowing said hot combustion products in preheating relation with said third stream $O_2$.

7. The process of claim 1 including the step of providing $SiF_4$, and reacting said $SiF_4$ with said molten Si to remove impurities therefrom in fluoride combined form.

8. The process of claim 7 including said $SiF_4$ supplied in a fluid stream, and said reacting of $SiF_4$ with the molten Si is carried out by bubbling said $SiF_4$ into said molten Si to remove said impurities in another stream.

9. The process of claim 8 including separately reacting said other stream with $SiO_2$ is produce $SiF_4$ and recycling said produced $SiF_4$ for reaction with said molten Si.

10. The process of claim 1 wherein said hydrocarbon consists essentially of $CH_4$.

11. The process of claim 7 wherein said impurities consist of $AlF_3$ and $BF_3$.

12. In a system for reducing $SiO_2$ in a retort to produce Si, the combination comprising
   (a) means to supply a hydrocarbon to said retort for reaction with $SiO_2$ therein to produce molten Si and gases including SiO, CO, $H_2$ and $H_2O$, and at elevated temperature in the retort between 1,500° C. and 2,000° C.,
   (b) means for removing said gases from the retort and for separating SiO in a first stream and CO and $H_2$ in a second stream, and
   (c) means associated with the retort to receive said second stream for combustion with $O_2$ to produce heat transferred into the retort to aid said reaction in (a).

13. The system of claim 12 including first heat transfer means associated with said (b) means to pass $O_2$ in condensing relation with said SiO to form said first SiO stream, the $O_2$ being preheated for supply to said (c) means for combustion with said second stream.

14. The system of claim 13 wherein hot products of combustion are produced by said (c) means, and including heat transfer means passing said hot products of combustion in pre-heating relation with said hydrocarbon being fed to the retort.

15. The system of claim 13 including means returning said first stream to the interior of the retort.

16. The system of claim 13 including means forming a purification zone to receive said molten silicon from the retort and to receive $SiF_4$ for reaction with received molten silicon in said zone.

17. The system of claim 16 including means forming another reaction zone to receive fluoride combined impurities from said purification zone and to react SiO therewith to produce $SiF_4$, and means returning said produced $SiF_4$ to said purification zone.

* * * * *